(12) United States Patent
Yokota

(10) Patent No.: US 9,459,916 B2
(45) Date of Patent: Oct. 4, 2016

(54) SYSTEM AND METHOD FOR CONTROLLING EXECUTION OF JOBS PERFORMED BY PLURAL INFORMATION PROCESSING DEVICES

(71) Applicant: FUJITSU LIMITED, Kawasaki-shi, Kanagawa (JP)

(72) Inventor: Hiroki Yokota, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 14/537,422

(22) Filed: Nov. 10, 2014

(65) Prior Publication Data
US 2015/0135188 A1    May 14, 2015

(30) Foreign Application Priority Data

Nov. 13, 2013  (JP) ................................. 2013-234585

(51) Int. Cl.
G06F 9/44   (2006.01)
G06F 9/45   (2006.01)
G06F 9/48   (2006.01)

(52) U.S. Cl.
CPC .............. *G06F 9/4881* (2013.01); *G06F 8/314* (2013.01); *G06F 8/10* (2013.01); *G06F 8/45* (2013.01)

(58) Field of Classification Search
CPC ............ G06F 8/314; G06F 8/45; G06F 8/10; G06F 8/456; G06F 9/5066
See application file for complete search history.

(56) References Cited

U.S. PATENT DOCUMENTS 8,015,564 B1 *  9/2011  Beyer ..................... G06F 9/505
                                                                    718/100
8,312,037 B1 * 11/2012  Bacthavachalu ..... G06F 9/5066
                                                                    707/769
8,713,571 B2 *  4/2014  Banguero ............... G06F 9/485
                                                                    718/102
9,183,058 B2 * 11/2015  Li .......................... G06F 9/5066
2006/0041644 A1 *  2/2006  Henseler ............ G06F 9/44526
                                                                    709/220

(Continued)

FOREIGN PATENT DOCUMENTS

JP    2001-249819    9/2001
JP    2006-65566    3/2006

OTHER PUBLICATIONS

Du et al., "TaskFolder—Dynamic and Fine-Grained Workload Consolidation for Mobile Devices", Jun. 2016, ACM, pp. 137-149; <http://dl.acm.org/citation.cfm?id=2906397&CFID=652367281&CFTOKEN=33341923>.*

(Continued)

*Primary Examiner* — Thuy Dao
*Assistant Examiner* — Ben C Wang
(74) *Attorney, Agent, or Firm* — Staas & Halsey LLP

(57) ABSTRACT

A system includes a plurality of information processing devices and a management device configured to manage execution of jobs performed by the plurality of information processing devices. The management device detects any one of the plurality of information processing devices which is executing a first job, at a predetermined time, and determines whether a second information processing device different from the first information processing device is able to be allocated to a second job which is scheduled to use the first information processing device being used by the first job after the predetermined time, among the plurality of information processing devices. The management device modifies an execution schedule of the jobs such that the second job is executed using the second information processing device when it is determined that the second information processing device is able to be allocated to the second job.

7 Claims, 13 Drawing Sheets

(56) References Cited

U.S. PATENT DOCUMENTS

| | | | | |
|---|---|---|---|---|
| 2008/0256223 A1* | 10/2008 | Chan | ............... | H04L 67/1008 709/223 |
| 2010/0223618 A1* | 9/2010 | Fu et al. | ............... | 718/102 |
| 2010/0318609 A1* | 12/2010 | Lahiri | ............... | G06F 9/5072 709/205 |
| 2011/0202924 A1* | 8/2011 | Banguero | ............... | G06F 9/4887 718/103 |
| 2011/0289519 A1* | 11/2011 | Frost | ............... | G06F 9/5027 719/328 |
| 2012/0110590 A1* | 5/2012 | Ghosh | ............... | G06F 11/3604 718/104 |
| 2012/0110591 A1* | 5/2012 | Ghosh | ............... | G06F 11/3604 718/104 |
| 2012/0254881 A1* | 10/2012 | Hamamoto et al. | ............... | 718/102 |
| 2014/0157219 A1* | 6/2014 | Ishikawa | ............... | G06F 17/5081 716/115 |
| 2014/0317716 A1* | 10/2014 | Chao | ............... | H04L 63/0815 726/9 |
| 2014/0337648 A1* | 11/2014 | Ujibashi | ............... | 713/322 |
| 2014/0344813 A1* | 11/2014 | Jamjoom et al. | ............... | 718/101 |
| 2014/0344814 A1* | 11/2014 | Jamjoom | ............... | G06F 9/4881 718/101 |
| 2015/0033233 A1* | 1/2015 | Hosokawa | ............... | G06F 9/4887 718/102 |
| 2015/0052530 A1* | 2/2015 | Jacobson | ............... | G06F 9/46 718/102 |
| 2015/0205639 A1* | 7/2015 | Matsumoto | ............... | G06F 3/0604 718/104 |
| 2016/0187018 A1* | 6/2016 | Honma | ............... | G05B 15/02 700/276 |

OTHER PUBLICATIONS

Li et al., "MapReduce Parallel Programming Model—A State-of-the-Art Survey", Oct. 2015, Springer, pp. 832-866; <http://link.springer.com/article/10.1007/s10766-015-0395-0>.*

Polo et al., "Performance-Driven Task Co-Scheduling for MapReduce Environments", Apr. 2010 IEEE, pp. 373-380; <http://ieeexplore.ieee.org/stamp/stamp.jsp?tp=&arnumber=5488494>.*

* cited by examiner

FIG.4

| TIME | COMPUTATION NODE 1 | COMPUTATION NODE 2 | COMPUTATION NODE 3 | COMPUTATION NODE 4 | ... |
|---|---|---|---|---|---|
| ⋮ | ⋮ | ⋮ | ⋮ | ⋮ | ⋮ |
| T0 | JOB A | JOB A | JOB A | JOB B | ... |
| T1 | JOB A | JOB A | JOB A | EMPTY | ... |
| T2 | EMPTY | EMPTY | EMPTY | EMPTY | ... |
| ⋮ | ⋮ | ⋮ | ⋮ | ⋮ | ⋮ |

SYSTEM AND METHOD FOR CONTROLLING EXECUTION OF JOBS PERFORMED BY PLURAL INFORMATION PROCESSING DEVICES

CROSS-REFERENCE TO RELATED APPLICATION

This application is based upon and claims the benefit of priority from the prior Japanese Patent Application No. 2013-234585 filed on Nov. 13, 2013, the entire contents of which are incorporated herein by reference.

FIELD

The embodiments discussed herein are related to system and method for controlling execution of jobs performed by plural information processing devices.

BACKGROUND

In a parallel computer such as a supercomputer, a scheduler is provided in a management system to allow the scheduler to manage an execution schedule of a job. When the scheduler generates the execution schedule of a job, information on a time required to execute the job is used but the time is estimated by a user who uses the parallel computer. The time required to execute the job varies depending on jobs, and the user predicts the time based on an experience or estimates the time based on a past record.

However, in some cases, an actual execution time of a job may be different from the estimated time. When the actual execution time is shorter than the estimated time (e.g., the job ends earlier than a scheduled time), there would be no problem. However, when the actual execution time is longer than the estimated time (e.g., the job does not end as scheduled), there is a problem on how to deal with the job.

In the related art, a job which does not complete until a scheduled time, is forcibly stopped in some cases. However, for a case where the job would be completed with a minimal extension of execution, the calculation performed until now would go to waste if the execution of the job is stopped and started all over again from the beginning.

Related techniques are disclosed in, for example, Japanese Laid-Open Patent Publication No. 2001-249819 and Japanese Laid-Open Patent Publication No. 2006-65566.

SUMMARY

According to an aspect of the invention, a system includes a plurality of information processing devices and a management device configured to manage execution of jobs performed by the plurality of information processing devices. The management device detects any one of the plurality of information processing devices which is executing a first job, at a predetermined time, and determines whether a second information processing device different from the first information processing device is able to be allocated to a second job which is scheduled to use the first information processing device being used by the first job after the predetermined time, among the plurality of information processing devices. The management device modifies an execution schedule of the jobs such that the second job is executed using the second information processing device when it is determined that the second information processing device is able to be allocated to the second job.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

According to an aspect, the job which has not ended until the scheduled time may be continuously executed.

BRIEF DESCRIPTION OF DRAWINGS

FIG. 4 is a diagram illustrating an example of data stored in a first schedule data storing unit, according to an embodiment;

DESCRIPTION OF EMBODIMENTS

First Embodiment

Figure 1:
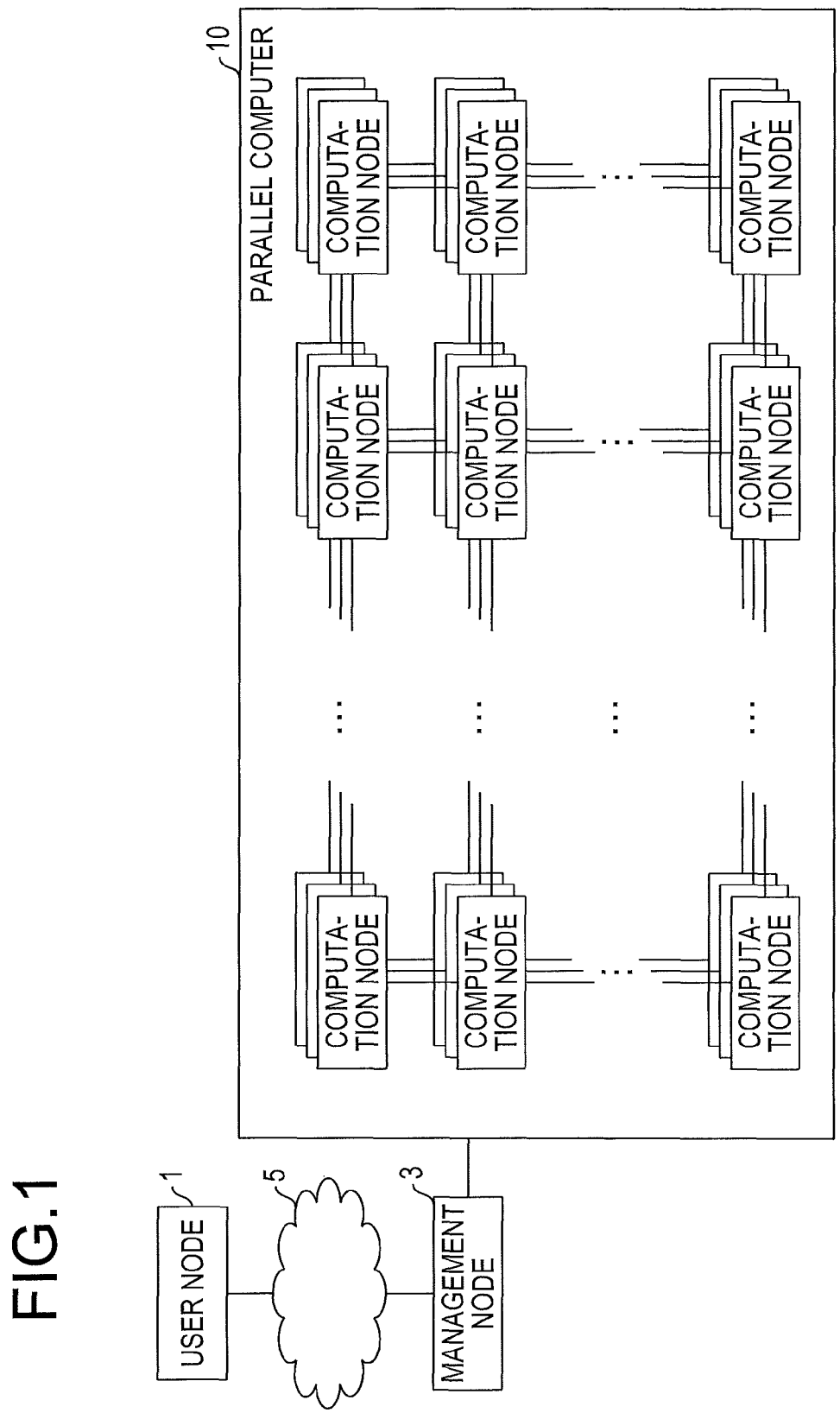
FIG. 1 is a diagram illustrating an example of a system, according to an embodiment.

FIG. 1 is a diagram illustrating an example of a system, according to an embodiment. A user node 1 manipulated by a user and a management node 3 are connected to a network 5 which is, for example, the Internet. The management node 3 manages a plurality of computation nodes which operates as a parallel computer 10. The user node 1 transmits an execution request of a job to the management node 3. The management node 3 performs scheduling of a job which is designated by the execution request and causes a computation node to execute the job in accordance with the schedule.

Figure 2:
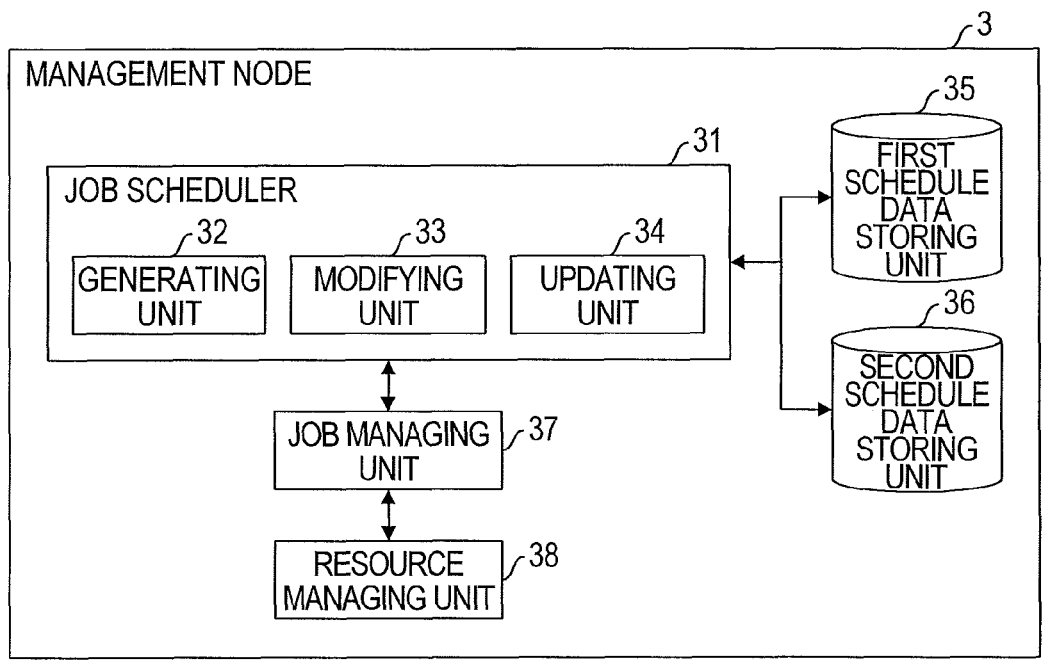
FIG. 2 is a diagram illustrating an example of a functional configuration of a management node, according to an embodiment.

FIG. 2 is a diagram illustrating an example of a functional configuration of a management node, according to an embodiment. The management node 3 includes a job scheduler 31 which includes a generating unit 32, a modifying unit 33, and an updating unit 34, a first schedule data storing unit 35, a second schedule data storing unit 36, a job managing unit 37, and a resource managing unit 38.

The job managing unit 37 receives, from the user node 1, a job execution request which includes job identifying information (for example, a job name), an amount of computing resources used for the job (e.g., the number of computation nodes and an amount of memory), and limit of an execution time of a job, and causes the job scheduler 31 to perform scheduling of the job designated in the job execution request. The generating unit 32 in the job scheduler 31 generates an execution schedule of a job based on data included in the job execution request to store the execution schedule in the first schedule data storing unit 35. The modifying unit 33 modifies the execution schedule stored in the first schedule data storing unit. The updating unit 34 generates an alternative execution schedule of the execution schedule stored in the first schedule data storing unit 35 to store the alternative execution schedule in the second schedule data storing unit 36. Further, the updating unit 34 updates the execution schedule stored in the first schedule data storing unit 35 with the execution schedule stored in the second schedule data storing unit 36. The resource managing unit 38 transmits data of a job (e.g., data including the identification information of the job and limit of the execution time of the job) that has been instructed to be executed by the job managing unit 37, to the parallel computer 10. Further, the resource managing unit 38 monitors a state of the job which is being executed in the parallel computer 10. Furthermore, the limit of the execution time is determined for every job by the user. Descriptions about handling of a job which exceeds the limit of the execution time will be given in detail later.

In at least one computation node in the parallel computer 10, a process which manages allocation of the computation nodes is activated. Further, the process controls a management process which manages the execution of a job activated in each computation node so that the job is executed in the computation node.

Figure 3:
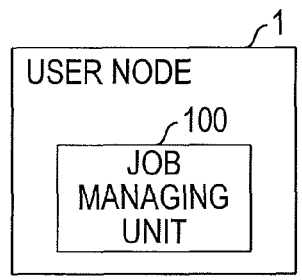
FIG. 3 is a diagram illustrating an example of a functional configuration of a user node, according to an embodiment.

FIG. 3 is a diagram illustrating an example of a functional configuration of a user node, according to an embodiment. The user node 1 includes a job managing unit 100. The job managing unit 100 receives, from the user, a job execution instruction including job identifying information, an amount of computing resources used for the job, and limit of an execution time of the job. The job managing unit 100 generates a job execution request including data included in the job execution instruction to transmit the job execution request to the management node 3.

FIG. 4 is a diagram illustrating an example of data stored in a first schedule data storing unit, according to an embodiment. In the example of FIG. 4, identification information of a job which uses each computation node is stored in the first schedule data storing unit 35 in association with each of times. When there is no job which uses a computation node, data indicating "empty" is stored in the first schedule data storing unit 35. The times include times in the past, current, and future. Data associated with a time in the past is deleted at a predetermined timing.

Figure 5:
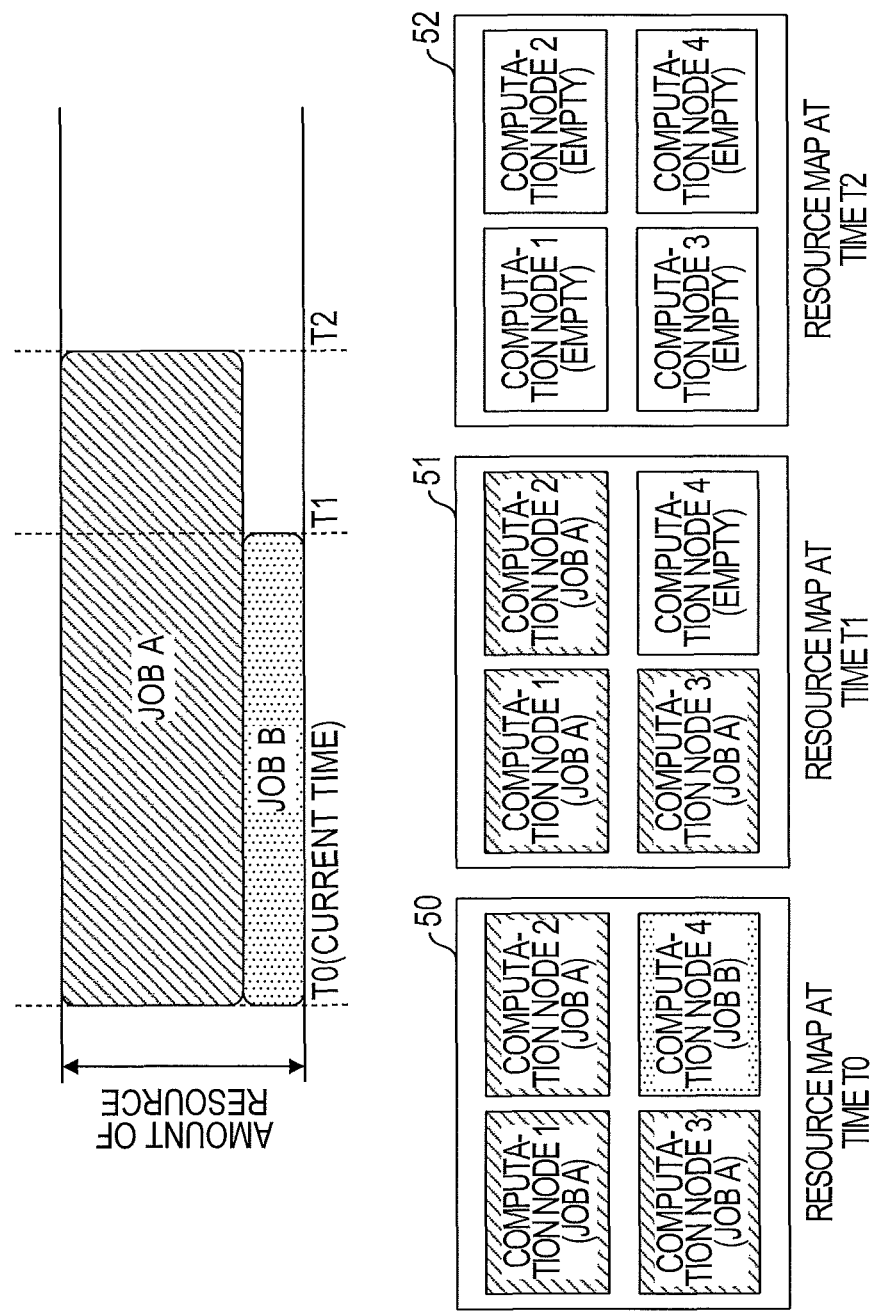
FIG. 5 is a diagram illustrating an example of a resource map, according to an embodiment.

For example, when the data illustrated in FIG. 4 is stored in the first schedule data storing unit 35, resource maps which manage a computing resource of the parallel computer 10 become the ones as illustrated in FIG. 5. In the example of FIG. 5, a resource map 50 at a time T0, a resource map 51 at a time T1, and a resource map 52 at a time T2 are illustrated. The blocks in a resource map illustrate computation nodes, and identification information of a job which is executed by the computation node is illustrated in a bracket. Further, on the upper half of FIG. 5, a temporal change in the amount of resources (e.g., the number of computation nodes in the present embodiment) which are used by the job is illustrated. In the example of FIG. 5, a job A which uses three computation nodes is executed from the time T0 to the time T2, and a job B which uses one computation node is executed from the time T0 to the time T1.

Figure 6:
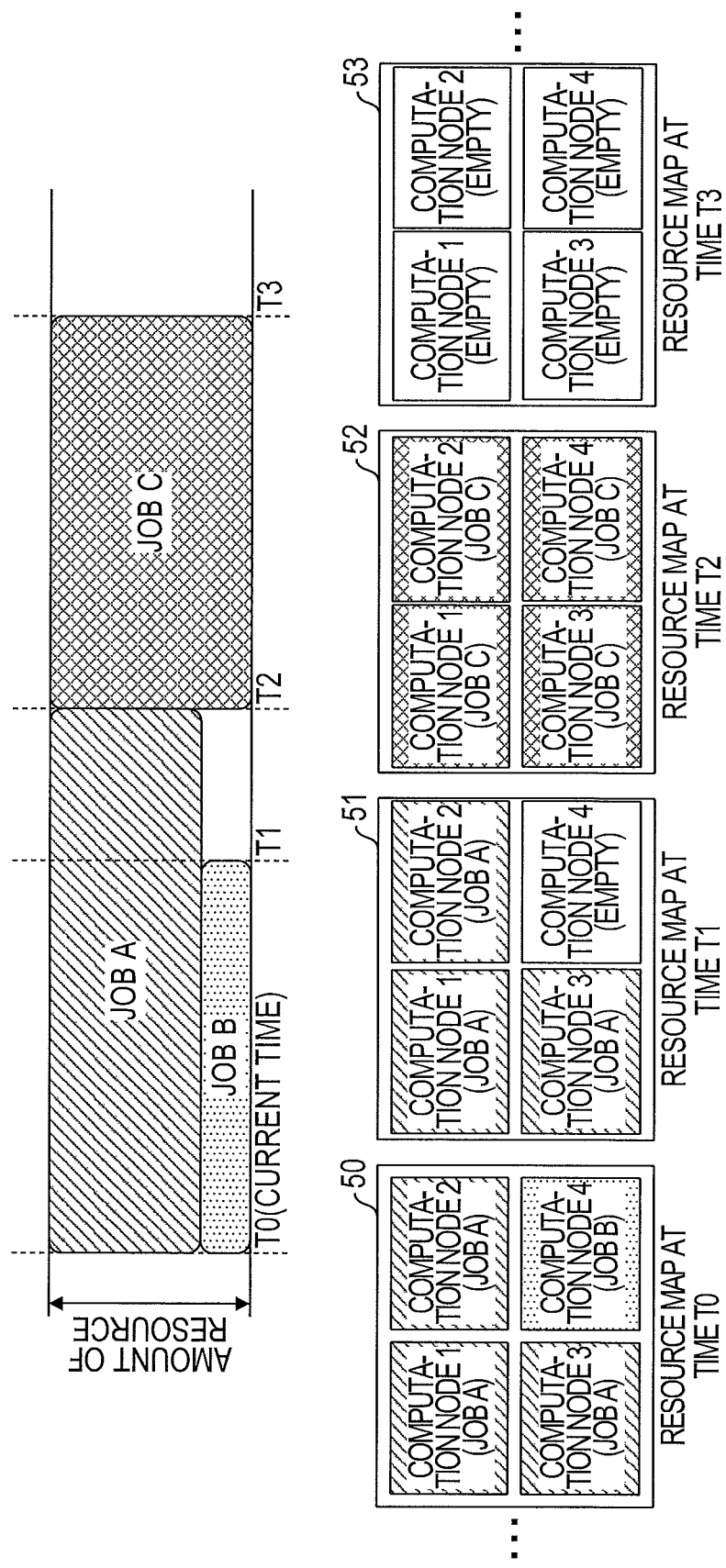
FIG. 6 is a diagram illustrating an example of a resource map, according to an embodiment.

For example, when an execution request of a job C is received at the time T0, an execution schedule for the job C is generated as illustrated on the upper half of FIG. 6. In an example of FIG. 6, an execution schedule in which the job C which uses four computation nodes is executed from the time T2 to the time T3 is generated. In the embodiment, a time corresponding to the limit of the execution time designated by the user and the computation node used for the job are secured. Accordingly, in the example of FIG. 6, the limit of the execution time which is designated for the job C by the user corresponds to a time spanning from the time T2 to the time T3. Further, on the lower half of FIG. 6, a resource map 50 at a time T0, a resource map 51 at a time T1, a resource map 52 at a time T2, and a resource map 53 at a time T3 are illustrated.

Next, an operation of the management node 3 will be described with reference to FIG. 7 to FIG. 11. The job managing unit 37 detects a job whose execution time has exceeded a time limit, based on the notification from the resource managing unit 38 which monitors the state of the job in the parallel computer 10 (step S1 of FIG. 7). The job managing unit 37 notifies the identification information of the job whose execution time has exceeded the time limit, to the job scheduler 31.

The generating unit 32 in the job scheduler 31 determines whether it is scheduled to execute another job other than the job whose execution time has exceeded the time limit, in the execution schedule which is stored in the first schedule data storing unit 35 (step S3).

When it is determined that it is not scheduled to execute another job ("NO" in step S3), a problem may not be caused even when the execution of the job whose execution time has exceeded the time limit is prolonged. Therefore, the modifying unit 33 modifies the execution schedule stored in the first schedule data storing unit 35 so as to prolong the execution of the job whose execution time has exceeded the time limit (step S5). Then, the process ends.

Figure 8:
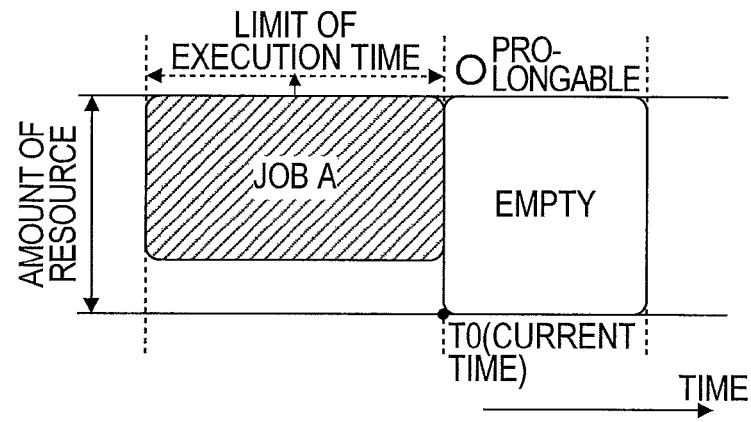
FIG. 8 is a diagram illustrating an example of an execution schedule of jobs, according to an embodiment.

FIG. 8 is a diagram illustrating an example of an execution schedule, according to an embodiment. FIG. 8 illustrates an example of an execution schedule corresponding to the "NO" route of step S3. In FIG. 8, the length in a vertical direction indicates an amount (e.g., the number of computation nodes here) of resources and time elapses as it goes to the right side. In the example of FIG. 8, the job A is being executed from a certain time in the past to the time T0 which is a current time, and the job A exceeds the limit of the execution time at the time T0. However, there is no job which is scheduled to be executed other than the job A so that problem may not be caused even when the execution of the job A is prolonged.

In the meantime, when it is determined that it is scheduled to execute another job ("YES" route of step S3 in FIG. 7), the generating unit 32 determines whether there is another job scheduled to use the computation node whose prolonged use is needed (e.g., a computation node used by the job whose execution time has exceeded the time limit) in the execution schedule stored in the first schedule data storing unit 35 (step S7).

When it is determined that there is no other job scheduled to use a computation node whose prolonged use is needed ("NO" route of step S7), a problem may not be caused even if the execution of the job whose execution time exceeds the time limit is prolonged. Therefore, the modifying unit 33 modifies the execution schedule stored in the first schedule data storing unit 35 so as to prolong the execution of the job whose execution time has exceeded the time limit (step S5). Then, the process ends.

Figure 9:
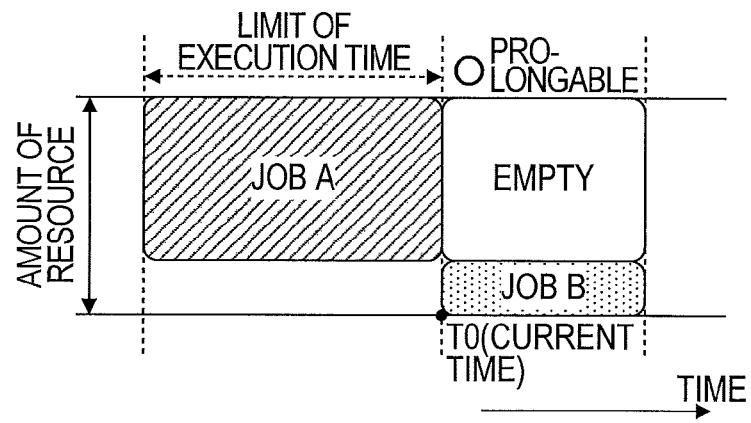
FIG. 9 is a diagram illustrating an example of an execution schedule of jobs, according to an embodiment.

FIG. 9 is a diagram illustrating an example of an execution schedule, according to an embodiment. FIG. 9 illustrates an example of an execution schedule corresponding to the "NO" route of step S7 in FIG. 7. In the example of FIG. 9, the job A is being executed from a certain time in the past to the time T0 which is a current time, and the job A exceeds the limit of the execution time at the time T0. Further, the job B is scheduled to be executed from the time T0. However, since the job B is not scheduled to use the computation node which is used by the job A, even though the execution of the job A is prolonged, the prolongation does not affect the execution of the job B. Therefore, the execution of the job A may be prolonged.

In the meantime, when it is determined that there is another job which is scheduled to use a computation node whose prolonged use is needed ("YES" route of step S7), the generating unit 32 specifies the number of computation nodes scheduled to be used in another job, based on the execution schedule stored in the first schedule data storing unit 35 (step S9).

The generating unit 32 determines whether another job may be executed by an empty computation node in step S11. Specifically, the generating unit 32 determines whether the number of computation nodes, which is specified at step S9, scheduled to be used in another job, exceeds the number of empty computation nodes.

When it is determined that another job may be executed by the empty computation nodes ("YES" route of step S11), the modifying unit 33 modifies the execution schedule stored in the first schedule data storing unit 35 so as to allocate an empty computation node to another job (step S13). Then, the process ends.

Figure 10:
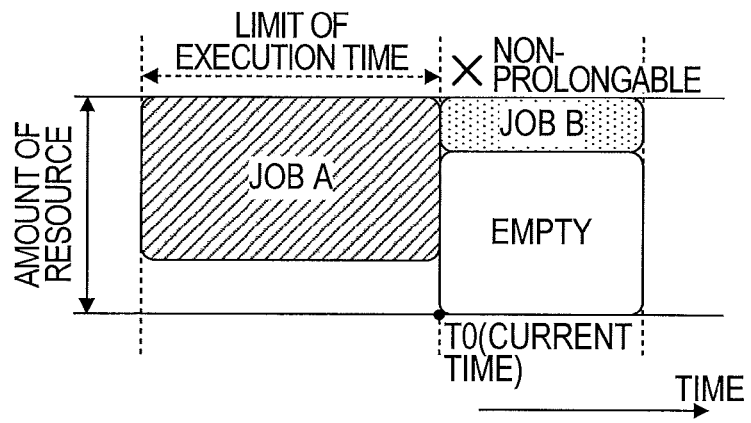
FIG. 10 is a diagram illustrating an example of an execution schedule of jobs, according to an embodiment.
Figure 11:
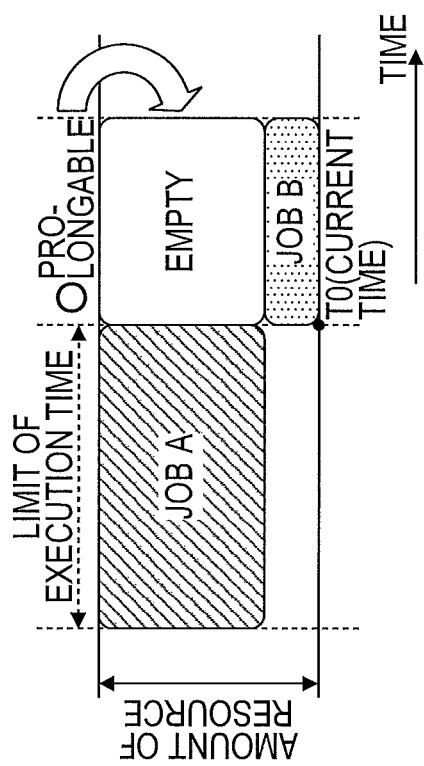
FIG. 11 is a diagram illustrating an example of an execution schedule of jobs, according to an embodiment.

FIG. 10 is a diagram illustrating an example of an execution schedule, according to an embodiment. FIG. 10 illustrates an example of an execution schedule corresponding to the "YES" route of step S11. In the example of FIG. 10, the job A is being executed from a certain time in the past to the time T0 which is a current time, and the job A exceeds the limit of the execution time at the time T0. Further, the job B is scheduled to be executed at the time T0. Since the job B is scheduled to execute the job using the computation node which will be used by the job A, the execution of the job A may not be prolonged in this state. However, the job B may be executed by the empty computation node. Therefore, as illustrated in FIG. 11, the execution schedule of the job is modified so as to allocate the empty computation node to the job B. In the example of FIG. 11, although the job B is executed from the time T0 like the example of FIG. 10, the job B does not use the computation node which is used by the job A. Therefore, the execution of the job A may be prolonged since it does not affect the execution of the job B.

Figure 7:
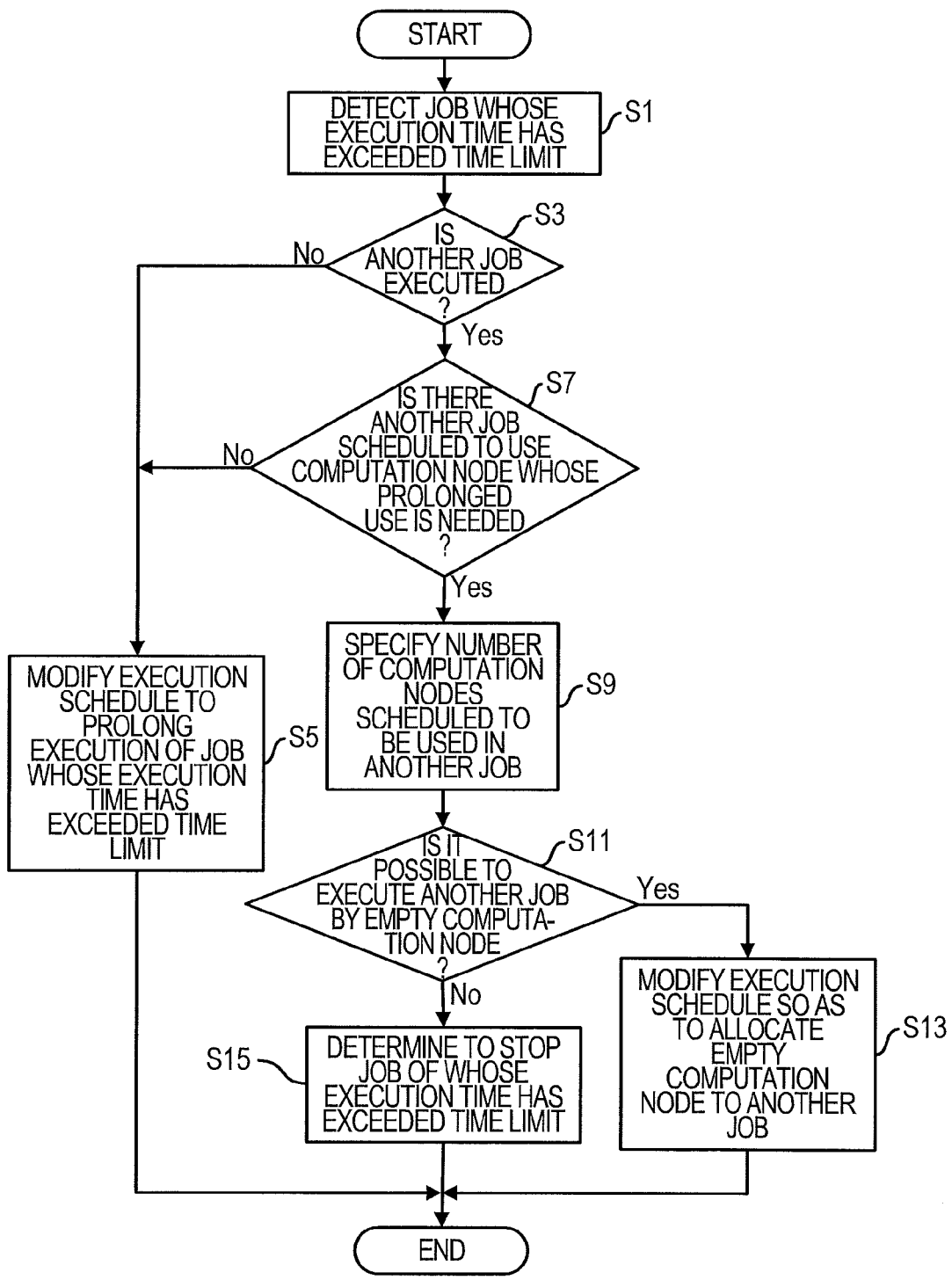
FIG. 7 is a diagram illustrating an example of an operational flowchart for main processing, according to an embodiment.

Referring back to the description of FIG. 7, when another job cannot be executed by the empty computation node ("NO" route of step S11), the generating unit 32 determines to stop the job whose execution time has exceeded the time limit (step S15). Then, the process ends. In the case, the computation node which executes the job has information on a limit of the execution time, and when the executing time exceeds the time limit, the computation node stops execution of the job.

By performing the process as described above, even though the execution time of the job exceeds the time limit, the job may be continuously executed without affecting the execution of another job. Therefore, the number of cases where a job is forcibly stopped due to an incompletion of the job within a scheduled time may be reduced. Further, since the empty computation node is used, an operating ratio of the computation node may be improved.

Second Embodiment

Next, a second embodiment will be described. In the second embodiment, before the execution time of a job exceeds the time limit, the job scheduler 31 generates an alternative execution schedule in advance. A process in which the job scheduler 31 generates the alternative execution schedule will be described with reference to FIG. 12 and FIG. 13. The processing is performed, for example, at a stage where the scheduling of a job which is being executed by the job scheduler 31 is completed.

Figure 12:
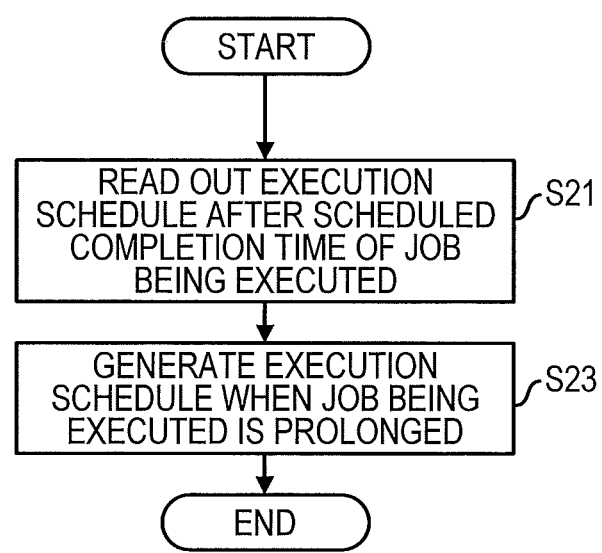
FIG. 12 is a diagram illustrating an example of an operational flowchart for a process which is executed before an execution time exceeds a limit, according to an embodiment.

First, an updating unit 34 in the job scheduler 31 reads out an execution schedule to be executed after a scheduled completion time of the job which is being executed (e.g., a time when the execution time of the job which is being executed reaches the time limit), from the first schedule data storing unit 35 (step S21 of FIG. 12).

The updating unit 34 generates an execution schedule when the job which is being executed is prolonged from the read execution schedule, and stores the execution schedule in the second schedule data storing unit 36 (step S23). Then, the process ends.

Figure 13:
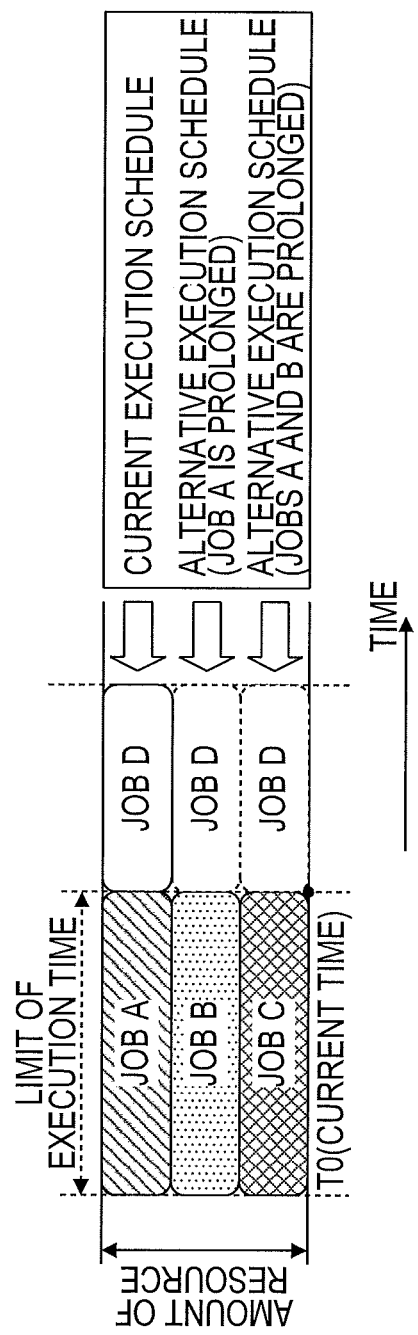
FIG. 13 is a diagram illustrating an example of an execution schedule of jobs, according to an embodiment.

At step S23, for example, an execution schedule as illustrated in FIG. 13 is generated. In an example of FIG. 13, a job A, a job B, and a job C are being executed at the current time and the jobs are executed until a certain time in the future, and a job D is scheduled to be executed after the certain time. In the current execution schedule, the job D is executed using a computation node used by the job A. In this example, at step S23, two execution schedules are generated as alternative execution schedules. Specifically, two execution schedules include an execution schedule by which the job D is executed using a computation node which is used for the job B when the job A is prolonged and an execution schedule by which the job D is executed using a computation node which is used by the job C when the job A and the job B are prolonged.

Since it takes time to perform a process of creating an execution schedule, it is possible to promptly cope with the change of the execution schedule when an execution schedule is generated in advance.

Next, a process performed by a management node 3 when the executing time of a job exceeds the time limit will be described with reference to FIG. 14 and FIG. 15. First, the job managing unit 37 detects whether an execution time of a job exceeds the time, based on the notification from the resource managing unit 38 which monitors the state of the job in the parallel computer 10 (step S31 of FIG. 14). The job managing unit 37 notifies the identification information of a job whose execution time has exceeded the time limit, to the job scheduler 31.

The generating unit 32 in the job scheduler 31 determines whether it is scheduled to execute another job other than the job whose execution time has exceeded the time limit, in the execution schedule stored in the first schedule data storing unit 35 (step S33).

When it is determined that it is not scheduled to execute another job ("NO" route of step S33), a problem may not be caused even when the execution of the job whose execution time has exceeded the time limit is prolonged. Therefore, the modifying unit 33 modifies the execution schedule stored in the first schedule data storing unit 35 so as to extend the execution of the job whose execution time has exceeded the time limit (step S35). Then, the process ends.

In the meantime, when it is determined that it is scheduled to execute another job ("YES" route of step S33), the generating unit 32 determines whether there is another job which is scheduled to use the computation node (e.g., a computation node which is being used by the job of which the execution time exceeds the time) whose prolonged use is needed, in the execution schedule stored in the first schedule data storing unit 35 (step S37).

When it is determined that there is no other job scheduled to use a computation node whose prolonged use is needed ("NO" route of step S37), a problem may not be caused even when the execution of the job whose execution time has exceeded the time limit is prolonged. Therefore, the modifying unit 33 modifies the execution schedule stored in the first schedule data storing unit 35 so as to extend the execution of the job whose execution time has exceeded the time limit (step S35). Then, the process ends.

In contrast, when it is determined that there is another job which is scheduled to use a computation node whose prolonged use is needed ("YES" route of step S37), the generating unit 32 requests the updating unit 34 to perform the processing. In response to the request from the generating unit 32, the updating unit 34 determines whether there is an execution schedule which may avoid stopping execution of the job whose execution time has exceeded the time limit, among the execution schedules which are stored in the second schedule data storing unit 36 (step S39).

When there is an execution schedule which may avoid stopping of the execution ("YES" route of step S39), the updating unit 34 updates the execution schedule stored in the first schedule data storing unit 35 with an execution schedule which may avoid stopping the execution (step S41). Then, the process ends.

Figure 15:
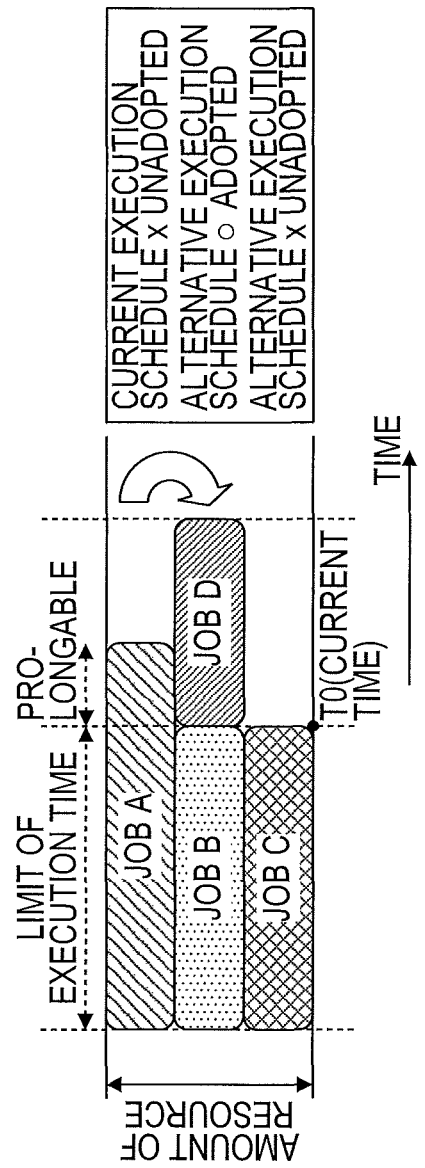
FIG. 15 is a diagram illustrating an example of an execution schedule of jobs, according to an embodiment.

For example, a situation as illustrated in FIG. 15 is assumed. An example of FIG. 15 is a situation where the time elapses from the situation illustrated in FIG. 13 and then execution times of the job A, the job B, and the job C reach the time limit. In this situation, the job A is being executed and stopping of execution of the job A is unavoidable according to the current execution schedule. Therefore, by the processing of step S41, one of the two alternative execution schedules which executes the job D using the computation node which was used for the job B is adopted, and the execution schedule is updated. Further, in the case of the example of FIG. 15, stopping of the execution of the job A is avoidable by adopting the other one of the two alternative execution schedules.

Figure 14:
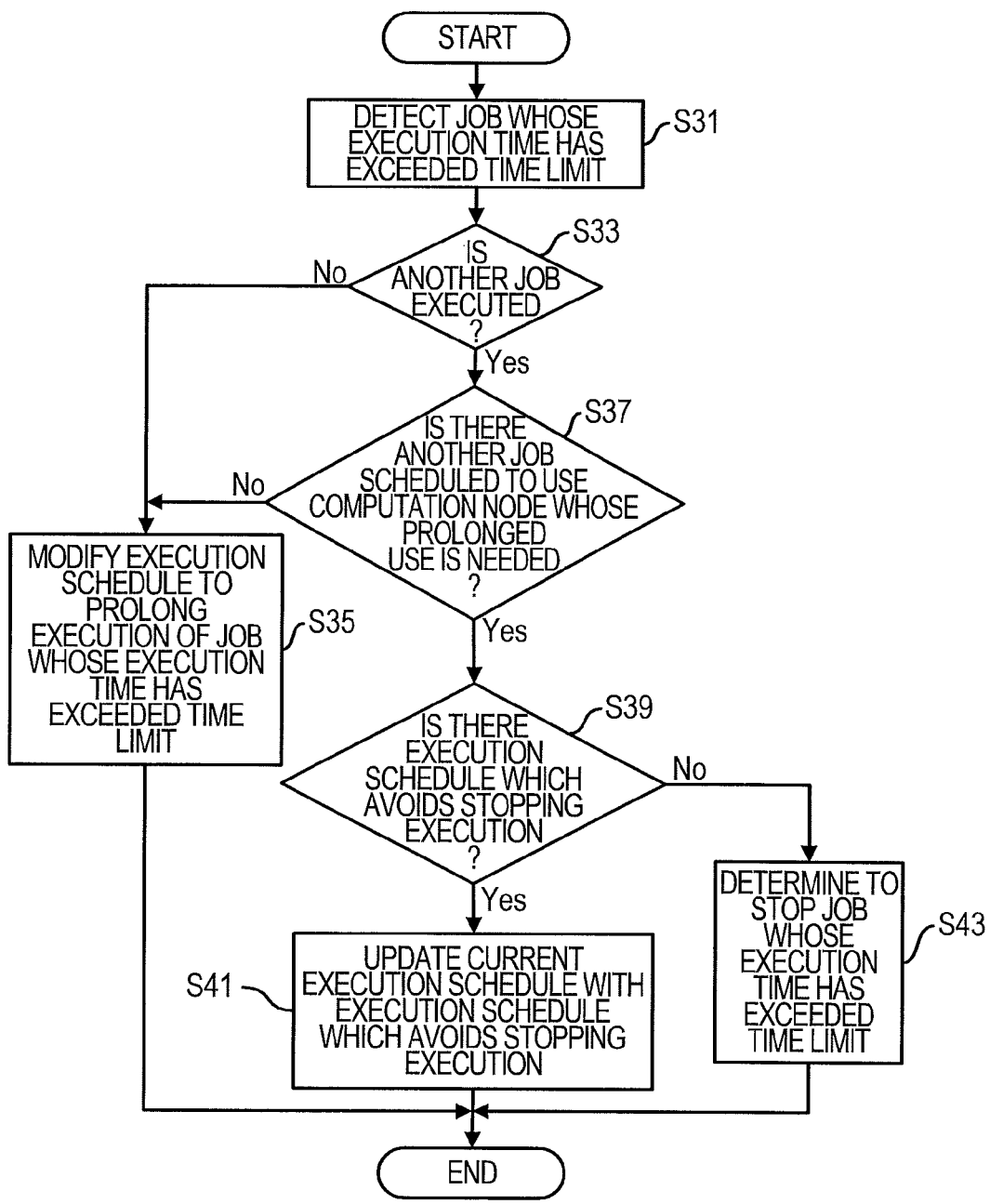
FIG. 14 is a diagram illustrating an example of an operational flowchart for a main process, according to an embodiment.

Returning to the description of FIG. 14, when there is no execution schedule which may avoid the executing stop ("NO" route of step S39), the generating unit 32 determines to stop the job whose execution time has exceeded the time limit (step S43). Then, the process ends. In the case, since the computation node which executes the job has information on a limit of the execution time, the computation node is able to stop execution of the job when the execution time exceeds the time limit.

When the process as described above is performed, the execution schedule does not need to be generated again in a stage when the execution time of the job actually exceeds the time limit, thereby allowing execution of a next job to be promptly started.

The embodiments of the present disclosure have been described above, but the present disclosure is not limited thereto. For example, the functional configuration of the user node 1 and the management node 3 which have been described above may not match an actual configuration of a program module in some cases.

Further, a configuration of each table described above is an example, and it is not necessarily the case that the configuration as described above is required. Further, in the process flow, if the process result is not changed, a procedural sequence of the process may be changed. Further, the processes may be performed in parallel.

Further, in the example described above, the computation node which executes the job has information on a limit of the execution time so that when the executing time exceeds the time limit, the computation node may stop the execution of the job. However, the job scheduler 31 may transmit a stopping request to stop the job to the computation node through a resource managing unit 38.

Figure 16:
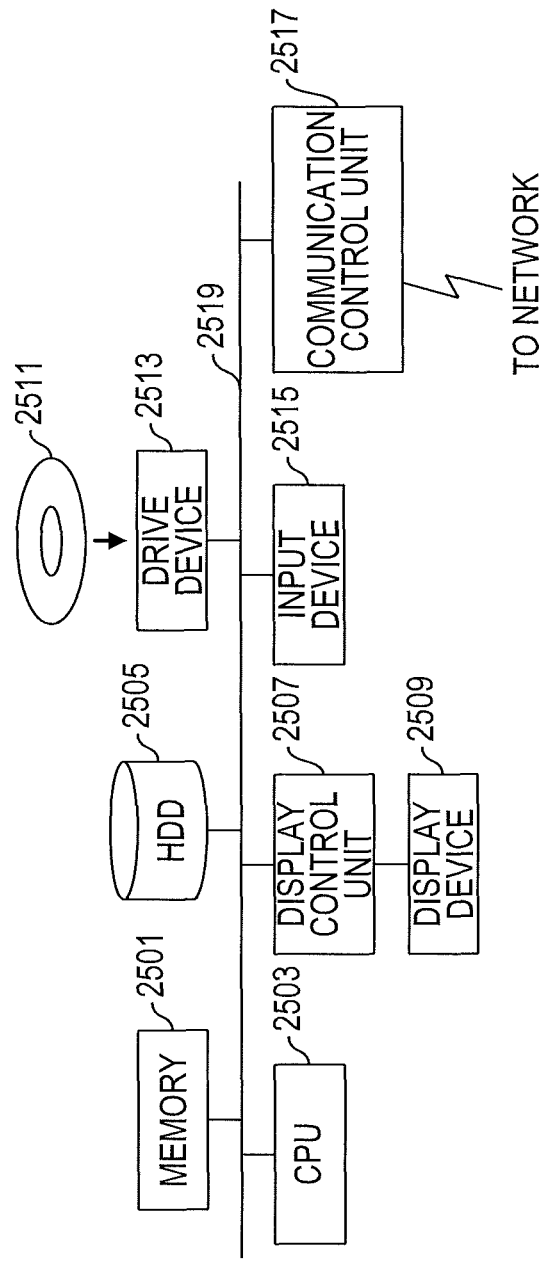
FIG. 16 is a diagram illustrating an example of a configuration of a computer, according to an embodiment.

Further, the user node 1, the management node 3, and the computation node described above may be each a computer device. In the computer device, as illustrated in FIG. 16, a memory 2501, a central processing unit (CPU) 2503, a hard disk drive (HDD) 2505, a display control unit 2507 which is connected to a display device 2509, a drive device 2513 for a removable disk 2511, an input device 2515, and a communication control unit 2517 for being connected with a network, may be connected to each other by a bus 2519. An operating system (OS) and an application program which performs a process in the embodiment may be stored in the HDD 2505 and read out from the HDD 2505 to the memory 2501 when being executed by the CPU 2503. The CPU 2503 controls the display control unit 2507, the communication control unit 2517, and the drive device 2513 in accordance with the processing contents of the application program to perform a predetermined operation. Further, data which is being processed is mainly stored in the memory 2501, but may be stored in the HDD 2505. In the exemplary embodiment of the present disclosure, the application program which performs the above-described processing is stored in the computer readable removable disk 2511 to be distributed and installed from the drive device 2513 into the HDD 2505. The application program may be installed in the HDD 2505 via the network such as the Internet and the communication control unit 2517. Such a computer device implements various functions as described above through the intimate cooperation of hardware, such as the CPU 2503 and the memory 2501 which are described above, and a program, such as the OS and the application program.

However, the computation node may be a CPU or a CPU core.

The embodiment of the present invention described above will be summarized as follows.

An information processing system according to a first aspect of the embodiment includes (A) a plurality of information processing devices and (B) a management device which manages the execution of jobs by the plurality of information processing devices. The management device described above includes (b1) a detecting unit (e.g, a job managing unit 37) which detects any one of the plurality of information processing devices which is executing a first job, at a predetermined time, (b2) a determining unit (e.g., a generating unit 32) which determines whether a second information processing device different from the first information processing device is able to be allocated to a second job which is scheduled to use the first information processing device being used by the first job after the predetermined time, among the plurality of information processing devices, and (b3) a modifying unit (e.g., a modifying unit 33) which when the determining unit determines that the second information processing device is able to be allocated to the second job, modifies an execution schedule of jobs such that the second job is executed using the second information processing device.

By doing this, even though the execution time of the job exceeds the time limit, the job may be continuously executed without affecting the execution of another job.

Further, the management device described above may further include (b4) an updating unit (e.g., the updating unit 34) which generates an execution schedule before the predetermined time when the execution of the first job is prolonged, to store the execution schedule in a data storing unit, and when it is determined that the first job is executed at the predetermined time, updates the execution schedule to a prolonged execution schedule in which the execution schedule of the first job stored in the data storing unit is prolonged. Since it takes time to perform the process of generating an execution schedule, when the process is performed when the execution time of the first job exceeds the time limit, starting of the execution of the second job may be delayed in some cases. Controlling an execution schedule as described above allows the execution schedule to be prepared in advance, thereby suppressing the delay of the executing start of the second job.

Further, the modifying unit described above may (b31) modify the execution schedule to prolong the execution of the first job when there is no schedule to execute a job other than the first job. This allows a job whose execution time has exceeded the time limit to be continuously executed when there is no problem in prolonging the execution of the job.

Further, the modifying unit described above may (b32) stop the execution of the first job when it is determined that the second information processing device is not able to be allocated to the second job. This allows the second job to be executed as scheduled.

A control method according to a second aspect of the embodiment is a control method of an information processing system which includes a plurality of information processing devices and a management device which manages the execution of jobs by the plurality of information processing devices. The control method includes processings of, by the management device described above, (C) detecting any one of the plurality of information processing devices which is executing a first job, at a predetermined time, (D) determining whether a second information processing device different from the first information processing device is able to be allocated to a second job which is scheduled to use the first information processing device being used by the first job after the predetermined time, among the plurality of information processing devices, and (E) modifying, when it is determined that the second information processing device is able to be allocated to the second job, an execution schedule of the jobs such that the second job is executed using the second information processing device.

Further, a program which allows a computer to execute the process by the above method may be generated and the program is stored in a computer readable storing medium such as a flexible disk, a CD-ROM, an optical magnetic disk, a semiconductor memory, or a hard disk or a storing device. Further, an intermediate processing result is temporarily stored in a storing device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A system, comprising:
    a plurality of information processing devices; and
    a management device having a memory storing executable instructions configured to manage execution of jobs by the plurality of information processing devices, wherein the management device is configured to:
        detect, at a predetermined time, a first information processing device from the plurality of information processing devices which is executing a first job whose execution time exceeds a time limit;
        determine whether a second information processing device different from the first information processing device and among the plurality of information processing devices may be allocated to a second job which is scheduled to be executed by the first information processing device being used by the first job after the predetermined time;
        modify an execution schedule of the jobs such that the second job is executed by the second information processing device when it is determined that the second information processing device may be allocated to the second job;
        generate an execution schedule before the predetermined time when the execution of the first job is prolonged;
        store the execution schedule in a data storing unit; and
        update the execution schedule to a prolonged execution schedule that is obtained by prolonging the execution schedule of the first job stored in the data storing unit when the first job being executed is detected at the predetermined time.

2. The system of claim 1, wherein
    the management device is configured to modify the execution schedule by prolonging the execution of the first job when there is no schedule to execute a job other than the first job for the first information processing device.

3. The system of claim 1, wherein
    the management device is configured to stop the execution of the first job when it is determined that the second information processing device may not be allocated to the second job.

4. A method performed by a system including a plurality of information processing devices and a management device, the management device managing execution of jobs by the plurality of information processing devices, the method comprising:

detecting, by the management device at a predetermined time, a first information processing device from the plurality of information processing devices which is executing a first job whose execution time exceeds a time limit;

determining whether a second information processing device different from the first information processing device and among the plurality of information processing devices may be allocated to a second job which is scheduled to be executed by the first information processing device being used by the first job after the predetermined time;

modifying an execution schedule of the jobs such that the second job is executed by the second information processing device when it is determined that the second information processing device may be allocated to the second job;

generating an execution schedule before the predetermined time when the execution of the first job is prolonged;

storing the execution schedule in a data storing unit; and updating the execution schedule to a prolonged execution schedule that is obtained by prolonging the execution schedule of the first job stored in the data storing unit when the first job being executed is detected at the predetermined time.

5. The method of claim 4, further comprising:

modifying the execution schedule by prolonging the execution of the first job when there is no schedule to execute a job other than the first job for the first information processing device.

6. The method of claim 4, further comprising:

stopping the execution of the first job when it is determined that the second information processing device may not be allocated to the second job.

7. A non-transitory, computer-readable recording medium having stored therein a program for causing a computer to execute a process, the computer being included in a management device managing execution of jobs by the plurality of information processing devices, the process comprising:

detecting, at a predetermined time, a first information processing device from the plurality of information processing devices which is executing a first job whose execution time exceeds a time limit;

determining whether a second information processing device different from the first information processing device and among the plurality of information processing devices may be allocated to a second job which is scheduled to be executed by the first information processing device being used by the first job after the predetermined time;

modifying an execution schedule of the jobs such that the second job is executed by the second information processing device when it is determined that the second information processing device may be allocated to the second job;

generating an execution schedule before the predetermined time when the execution of the first job is prolonged;

storing the execution schedule in a data storing unit; and updating the execution schedule to a prolonged execution schedule that is obtained by prolonging the execution schedule of the first job stored in the data storing unit when the first job being executed is detected at the predetermined time.

* * * * *